(12) United States Patent
Merker et al.

(10) Patent No.: US 10,830,631 B2
(45) Date of Patent: Nov. 10, 2020

(54) DEVICE AND METHOD FOR MEASURING THE LEVEL OF LIQUID IN A CONTAINER

(71) Applicant: TRUMA GERAETETECHNIK GMBH & CO. KG, Putzbrunn (DE)

(72) Inventors: Johannes Merker, Hoehenkirchen-Siegertsbrunn (DE); Andreas Schmoll, Grasbrunn (DE); Daniel Pless, Zorneding (DE)

(73) Assignee: TRUMA GERAETETECHNIK GMBH & CO. KG, Putzbrunn (DE)

( * ) Notice: Subject to any disclaimer, the term of this patent is extended or adjusted under 35 U.S.C. 154(b) by 70 days.

(21) Appl. No.: 16/168,063

(22) Filed: Oct. 23, 2018

(65) Prior Publication Data

US 2019/0056259 A1     Feb. 21, 2019

Related U.S. Application Data

(62) Division of application No. 15/042,890, filed on Feb. 12, 2016, now Pat. No. 10,180,343.

(30) Foreign Application Priority Data

Aug. 21, 2015   (DE) ........................ 10 2015 113 908

(51) Int. Cl.
  *G01F 23/296* (2006.01)
  *G10K 11/00* (2006.01)
(52) U.S. Cl.
  CPC ...... *G01F 23/2968* (2013.01); *G01F 23/2962* (2013.01); *G10K 11/004* (2013.01)

(58) Field of Classification Search
  CPC ............ G01F 23/2968; G01F 23/2962; G10K 11/004
  See application file for complete search history.

(56) References Cited

U.S. PATENT DOCUMENTS

| 5,335,545 | A | 8/1994 | Leszczynski |
| 5,463,905 | A | 11/1995 | Baird |
| 5,558,430 | A | 9/1996 | Booty, Jr. |

(Continued)

FOREIGN PATENT DOCUMENTS

| CA | 2644410 | C1 | 2/2009 |
| CL | 2017001410 | A1 | 12/2017 |

(Continued)

*Primary Examiner* — Paul M. West
(74) *Attorney, Agent, or Firm* — McNees Wallace & Nurick LLC

(57) ABSTRACT

The invention relates to a filling level measuring device (10) for measuring the filling level in a container (2) through the wall (9) thereof by means of ultrasound, having an ultrasonic measuring head (12), a controller (20), and a fastening device (24) by means of which the filling level measuring device (10) can be fastened to the container (2) such that the ultrasonic measuring head (12) is pressed against the wall (9) of the container (2). The invention further relates to a method of operating such a filling level measuring device (10), wherein a sampling rate is used which is situation-dependent. The invention finally relates to an assembly made up of such a filling level measuring device and at least one spacer (50) which can be attached to the lower edge of a container (2) to be provided with the filling level measuring device (10).

11 Claims, 6 Drawing Sheets

(56) References Cited

U.S. PATENT DOCUMENTS

| | | | |
|---|---|---|---|
| 6,397,656 | B1 | 6/2002 | Yamaguchi et al. |
| 8,104,341 | B2 | 1/2012 | Lagergren et al. |
| 10,180,343 | B2* | 1/2019 | Merker .................. G01S 7/521 |
| 2003/0021186 | A1 | 1/2003 | Lyon |
| 2004/0226362 | A1 | 11/2004 | Marx et al. |
| 2007/0084283 | A1 | 4/2007 | Carlson et al. |
| 2007/0103324 | A1 | 5/2007 | Kosuge et al. |
| 2008/0036615 | A1 | 2/2008 | Lyall, III |
| 2008/0112287 | A1 | 5/2008 | Yoshimoto et al. |
| 2008/0155064 | A1 | 6/2008 | Kosuge et al. |
| 2011/0029262 | A1 | 2/2011 | Barkhouse |
| 2011/0190579 | A1 | 8/2011 | Ziarno et al. |
| 2011/0264012 | A1* | 10/2011 | Lautzenhiser ......... G10K 11/02 601/2 |
| 2014/0107954 | A1 | 4/2014 | Lih et al. |
| 2015/0135840 | A1 | 5/2015 | Sato et al. |
| 2015/0369639 | A1 | 12/2015 | Lukie et al. |
| 2017/0059389 | A1 | 3/2017 | Moore et al. |

FOREIGN PATENT DOCUMENTS

| | | |
|---|---|---|
| DE | 19820482 C1 | 7/1999 |
| DE | 10061531 A1 | 6/2002 |
| DE | 10312100 A1 | 9/2004 |
| DE | 102006032250 A1 | 1/2008 |
| DE | 102011051494 A1 | 1/2013 |
| DE | 202011110687 U1 | 7/2015 |
| EP | 0836081 A2 | 4/1998 |
| EP | 0989998 A2 | 2/2002 |
| GB | 2109934 A | 6/1983 |
| GB | 2498952 A | 8/2013 |
| JP | S57-128843 A | 3/1984 |
| JP | H06347019 A | 12/1994 |
| JP | H10-339722 A | 11/1999 |
| JP | 2000-228796 A | 2/2002 |
| JP | 2002-013965 A | 8/2002 |
| JP | 2001-082998 A | 9/2002 |
| JP | 2001-091335 A | 10/2002 |
| JP | 2002-148093 A | 12/2003 |
| JP | 2004-333314 A | 6/2006 |
| JP | 2008203207 A | 9/2008 |
| JP | 2007-218740 A | 3/2009 |
| JP | 2009-139212 A | 6/2009 |
| JP | 2009-168554 A | 12/2009 |
| JP | 2011007764 A | 1/2011 |
| JP | 2011-038975 A | 9/2012 |
| JP | 2012-251836 A | 7/2013 |
| WO | 2009026672 A1 | 3/2009 |
| WO | 2010111450 A1 | 9/2010 |

\* cited by examiner

DEVICE AND METHOD FOR MEASURING THE LEVEL OF LIQUID IN A CONTAINER

This application claims benefit from and is a divisional of U.S. application Ser. No. 15/042,890, filed Feb. 12, 2016, titled DEVICE AND METHOD FOR MEASURING THE LEVEL OF LIQUID IN A CONTAINER, which claims benefit from Application No. DE 10 2015 113 908.1, filed on Aug. 21, 2015, entitled FUELLSTANDSMESSGERAET, VERFAHREN ZUM BETREIBEN EINES FUELLSTANDSMESSGERAETS SOWIE BAUGRUPPE BESTEHEND AUS EINEM FUELLSTANDSMESSGERAET UND MINDESTENS EINEM ABSTANDSHALTER which application is hereby incorporated by reference in its entirety.

The invention relates to a filling level measuring device for measuring the filling level in a container through the wall thereof by means of ultrasound.

By measuring a filling level by means of ultrasound, the filling level in the container can be determined without a filling level meter having to be introduced into the interior of the container or the container having to be opened for the purpose of measuring. This is of advantage in particular for containers which are under a high pressure, for example liquefied gas cylinders, or are not adapted to be opened for other reasons.

DE 20 2011 110 687 discloses a mobile filling level measuring device for measuring the filling level by means of ultrasound. It is in the form of a hand-held measuring device which is pressed against the wall of the container by a user when required, to carry out a measuring process. The filling level measuring device will then indicate whether or not a liquid is present inside the container at the level at which the measuring device was applied.

DE 198 20 482 C1 discloses a stationary filling level measuring device which is integrated in a base onto which a gas cylinder can be placed.

The object of the invention consists in providing a filling level measuring device which is suitable for stationary applications over a long period of time and can be employed with a multitude of different containers and types of containers.

To achieve this object, according to the invention provision is made for a filling level measuring device for measuring the filling level in a container through the wall thereof by means of ultrasound, including an ultrasonic measuring head, a controller, and a fastening device by means of which the filling level measuring device can be fastened to the container such that the ultrasonic measuring head is pressed against the wall of the container. The invention is based on the fundamental idea of integrating a fastening device into the filling level measuring device, so that the latter is permanently held at the container. In this way, the filling level measuring device can be used for long-term measurements of the filling level. Furthermore, it can be employed for a large number of different containers since it can be flexibly fastened to the wall of the container independently of the specific geometry thereof.

According to a preferred embodiment of the invention, provision is made that the fastening device contains magnets. This embodiment allows the filling level measuring device to be attached, with the most minimal effort, to any container consisting of a ferromagnetic material, that is, in particular to any steel cylinder. The clamping magnets hold the filling level measuring device in the desired position until it is removed again.

According to an alternative embodiment of the invention, provision is made that the fastening device contains an adhesive. In this embodiment, the filling level measuring device may be stuck to the wall of the container at the desired place similar to a medical tape, where it will then remain on a long-term basis. In order to attach the filling level measuring device to the next container after it has been removed from the previous container, the "old" adhesive layer may be used again or a new adhesive layer is applied, depending on the type of adhesive.

According to yet another embodiment of the invention, provision is made that the fastening device contains a spring clip. The spring clip is particularly suitable for attaching the filling level measuring device to any projecting parts of the container, for example a foot rim or a handle.

The fastening device may also contain a tensioning strap. This strap extends around the circumference of the container to press the filling level measuring device and, in particular, the ultrasonic measuring head against the wall thereof.

According to a preferred embodiment of the invention, a communication interface is provided, which can be used for transmitting measured filling level values to the outside, so that they can be displayed to a user.

The communication interface preferably includes a transmitter/receiver unit for a wireless communication. In this way, the effort for a wiring of the filling level measuring device is dispensed with.

Preferably, the transmitter/receiver unit operates on the Bluetooth standard. This allows the measured filling level values to be transmitted over a distance that is fully sufficient for many applications, at a low energy consumption (for example in the camping sector, for a barbecue, for patio heaters, a catering business, or for roofers).

According to an alternative embodiment, provision is made that the communication interface is a plug. This allows a wired data transfer to be effected for example to a bus system (LIN bus or CAN bus).

According to one configuration of the invention, provision is made here that a power supply for the controller is integrated in the communication interface. In this way, a separate energy supply of the filling level measuring device may be dispensed with.

According to a preferred embodiment, an energy source is integrated in the filling level measuring device. This makes the filling level measuring device completely self-contained.

The energy source may contain two batteries. These batteries can ensure an energy supply over a sufficiently long period of time, for example up to one year, at low cost.

Here, the batteries are preferably exchangeable, so that the filling level measuring device as such can be used over a long time.

According to a preferred embodiment of the invention, provision is made that the batteries are arranged at a distance from the ultrasonic measuring head. This is of advantage from the aspects of structural space in cases of application in which the filling level measuring device is used on the bottom of a gas cylinder. In this case, in fact, the ultrasonic measuring head is usually located at the lowest point of the bottom, that is, where the distance from the ground is smallest. The distance between the ground and the bottom of the gas cylinder is greater at the sides thereof, so that it is simpler to accommodate the batteries there.

Preferably, the two batteries are arranged diametrically opposite to each other on the outer edge of the filling level measuring device, since this is where the greatest amount of space is available.

According to one configuration of the invention, a housing is provided in which the components of the filling level measuring device are integrated. As a result, the filling level measuring device is simple to handle, and the components are mechanically protected.

According to one configuration, it is provided for that the housing is one-piece. This makes it easier to attach the filling level measuring device to the container.

According to one configuration, provision is made here that the housing is made from an elastomeric plastic and is intrinsically bendable. This allows the filling level measuring device to be flexibly attached to containers which differ in terms of the curvature of the wall against which the ultrasonic measuring head is to be pressed. In addition, owing to the material, an especially effective protection from external mechanical loads is obtained, for example when the container is placed on an uneven ground and the filling level measuring device contacts the ground.

According to an alternative design, provision is made that the housing is configured in several parts with a joint between the parts. This allows the filling level measuring device to be flexibly attached to containers which differ in terms of the curvature of the wall against which the ultrasonic measuring head is to be pressed.

According to one embodiment, a spring band is provided between the parts of the housing here. In this way, the desired contact pressure of the ultrasonic measuring head against the wall of the container can be generated with little effort.

The ultrasonic measuring head may also be arranged in the housing so as to be spring-mounted, so that it rests against the wall of the container with the desired contact pressure when the filling level measuring device is attached to the wall of the container.

According to one embodiment, springs are provided which urge the ultrasonic measuring head against the wall of the container. Using such springs, the desired contact pressure can be produced over a long time.

According to one configuration of the invention, provision is made here that the springs are made from plastic in one piece with the housing. In this way, the effort for mounting separate springs is avoided.

If the fastening device contains one or more magnets, preferably a retainer is provided for the magnet or magnets, the retainer being closed by a housing wall on its side toward the container. In other words, the magnet (or magnets) is/are separated from the wall of the container by the housing wall. This has two advantages: for one thing, a protection from corrosion of the magnets is obtained because the housing seals the magnets off on the side facing the container. For another thing, the magnetic forces that act when the housing is attached to a container are absorbed by the housing without any additional measures being necessary for ensuring that the magnet or magnets reliably remain(s) within the retainer even over a long service life.

According to one embodiment of the invention, a temperature sensor is provided. The temperature sensor can be used for increasing the measuring accuracy since the sound velocity in liquids depends on the temperature, among other things. In addition, because of the thermal expansion of the liquid, the liquid level in the container is also temperature-dependent. If the liquid that is considered is liquefied gas, it is to be noted that the two effects have a significant and nonlinear influence on the propagation time of the sound signal, with the amount of gas being otherwise unchanged, so that for ascertaining the correct amount of liquefied gas in the container, a temperature-dependent compensation is required. It is sufficient here if the temperature is measured in the filling level measuring device and therefore in the vicinity of the container since it can be assumed that the temperature measured outside the container, for example on the underside thereof, is approximately the same as the temperature of the liquid inside the container, at least if extreme cases such as one-sided solar radiation or heavy temperature changes are excluded.

The temperature sensor may be integrated in a coupling cushion which is arranged on that side of the ultrasonic measuring head which faces the wall of the container. In this way, the temperature sensor is located in the vicinity of the wall of the container while it is well protected from environmental influences at the same time.

Preferably, the housing is provided with a load transmission section which is arranged in the vicinity of the coupling cushion. The load transmission section either lies against the bottom of the container or is located at a small distance from the bottom. If the filling level measuring device is excessively strongly pressed against the container, for example because there is a protruding object underneath the housing, the loads are transmitted directly to the container via the load transmission section, so that the coupling cushion and the measuring head are protected from high forces. At the same time, the housing is protected from high loads.

The coupling cushion consists of an elastomer and ensures the good sound transmission between the ultrasonic measuring head (in particular an ultrasonic generator used there, such as a piezoceramics) and the wall of the container while at the same time the ultrasonic measuring head is protected from a direct contact. Furthermore, if the coupling cushion is configured with a sufficient compressibility, it can compensate different degrees of bulginess of the wall of the container and also certain tolerances and can therefore ensure a good sound transmission in each case. The elastomer is designed here such that with the usual contact pressure forces, the yield point of the elastomer is not reached, so that the contact pressure against the wall of the container is maintained even in the case of a long and constant pressure.

The coupling cushion may be encapsulated with or firmly bonded to the ultrasonic measuring head.

According to a preferred embodiment, the elasticity of the coupling cushion is selected such that the coupling cushion generates, on its own (that is, without springs being required in the housing), the necessary contact pressure of the ultrasonic measuring head against the wall of the container when the filling level measuring device is pressed against the wall of the container by the action of the fastening device. This contact pressure deforms the coupling cushion to such an extent that it conforms well to the shape of the wall of the container and the ultrasonic waves are well coupled into the wall of the container by the piezoceramics, and vice versa.

According to a preferred embodiment of the invention, the coupling cushion is mounted to the housing so as to be exchangeable. This allows a user to exchange the coupling cushion if required, for example in the case of wear or if the coupling cushion no longer has the desired elasticity after a long time of use.

According to one embodiment, provision may be made here for a plurality of coupling cushions in the nature of a modular system, which are configured with different geometries. This allows the user to adapt, with little effort, the filling level measuring device to containers having different geometries, so that an optimum measuring accuracy is obtained at all events.

According to one variant, the coupling cushion is adhesively bonded to the ultrasonic measuring head so as to be easily detachable. This allows the user to remove an old coupling cushion or one that no longer fits in terms of its geometry, from the ultrasonic measuring head and to fix a new coupling cushion in place.

Alternatively or additionally, the coupling cushion may be mechanically fastened to the filling level measuring device. To this end, clamping connections or a quarter-turn fastener may be used, so that the coupling cushion can, on the one hand, be exchanged with little effort, but, on the other hand, is reliably held.

According to one embodiment of the invention, provision is made that the controller contains a prognosis module with a memory. This allows to provide to a user an estimated value, on the basis of the consumption in the past, until when the supply in the container will still last.

The controller may also contain a characteristics module in which the development of a filling height in dependence on the liquid volume present in the container is stored. The characteristics module can be used for increasing the accuracy of the filling level measurement, particularly when the cross-section of the container varies over the filling height. One example thereof is the bulged shape of a gas cylinder in the lower portion.

In the operation of the filling level measuring device, it is advantageous if a sampling rate is used which is situation-dependent. Generally speaking, a high sampling rate, that is, a comparatively rapid sequence of individual measuring processes, is used when, based on external influences, the controller detects that this is of advantage. Conversely, the sampling rate is reduced if the controller realizes that a high sampling rate makes no sense. These measures allow the operating time to be increased that can be obtained with one set of batteries.

When the controller detects that the filling level measuring device is mounted to a new container, preferably a series of measurements is initiated the results of which are averaged to determine a starting filling level. In this way, a reliable measured filling level value is available to a user after a comparatively short time.

After the starting filling level has been determined, the controller preferably reduces the sampling rate. This is possible without any problems without a decrease in the accuracy of the filling level ascertained, because the filling level in a gas cylinder, for example, will not change so greatly, even when consumption is at a maximum, that one measurement every minute, for example, would not be sufficient.

The sampling rate may be further reduced when the controller ascertains a constant filling level over a longer period of time. This can be construed by the controller to mean that no liquid is currently taken from the container, so that one measurement per hour, for example, is sufficient. Then, as soon as a decrease in the filling level is detected again, the controller can also raise the sampling rate again.

According to one configuration of the invention, provision is made that the controller greatly reduces the sampling rate or discontinues the measurements altogether if it detects no communication of the filling level measuring device with an external receiver. In simpler terms, this configuration is based on the principle that no measurement will be performed if nobody asks for the measured filling level value. One example of this process is a recreational vehicle or campervan that is immobilized outside of vacation times. As a result, a receiver that normally communicates with the filling level measuring device is also shut down. When the controller detects that no communication is possible, the sampling rate may be reduced to a very low value or even to zero. When the controller detects that a communication has been established again, a higher sampling rate can be utilized again. In this case, it is also possible to initially use a greatly increased sampling rate such as is used when a new container is identified.

According to one configuration of the invention, when the controller detects a low filling level, it proceeds from an evaluation of a first echo of the ultrasonic waves generated to an evaluation of a second or third echo of the ultrasonic waves. This allows a reliable measurement even when the filling level is low. When there is a low filling level in the container, the time interval between emission of the ultrasonic signal and reception of the echo becomes shorter and shorter. To make things more difficult, after emission of the sound signal, the ceramics will still post-oscillate for a while and will therefore not be immediately ready to receive. Therefore, it may possibly be difficult to measure the first echo, i.e. the first reflection of the ultrasonic waves at the interface between the liquid and the gas. Usually, however, the wave front is reflected several times, that is, after a reflection at the liquid/gaseous interface it is reflected at the bottom of the container again, then at the interface again, then at the bottom again, and so on. While these echoes become increasingly weaker, they are basically suitable for evaluation.

According to one embodiment, it is provided that when the filling height is low, the transmitting power of the ultrasonic measuring head is reduced. This is based on the finding that when liquid levels are low, the propagation distance of the sound waves is smaller, so that even in the case of a low transmitting power, an echo will reliably arrive at the ultrasonic measuring head. A low transmitting power has the advantage that the reverberation time after emission of the sound wave decreases and, therefore, the ceramics returns to a ready-to-receive state again faster. In this way, lower filling levels can be measured.

According to one configuration of the invention, provision is made that when the controller detects that the filling level falls below a defined filling level, it causes the user to receive a special notice. This may be an alarm message on the display device (for example on the smartphone). This ensures that the user will take appropriate measures in time, for example arrange for a replacement of the empty liquid container.

Provision may also be made that the controller sends an appropriate signal relating to a low filling level to a vehicle-mounted controller to which a variety of devices are connected, such as a refrigerator or a heating system. In a first step, a signal may be provided to the user on a screen that the filling level is low and that a replacement should be procured. However, depending on the filling level, the vehicle-mounted controller can take further measures, such as, e.g., reduce the power of those devices that are connected to the gas cylinder, in order to reduce consumption. For instance, the power of a heating system could be lowered to such a degree that the heating then only has the function of a frost monitor. A freezer compartment of a refrigerator could be turned to a slightly higher temperature to reduce the temperature difference as compared with the surroundings and thus to reduce consumption.

According to one embodiment of the invention, it is provided that when the controller detects that the filling level falls below a defined filling level, it arranges for a new container to be procured. In a preferred embodiment, this is achieved in that an application software on the smartphone arranges for a repeat order from an appropriate service provider to be initiated. This may be performed via an Internet connection or an SMS communication, for example. This is an especially convenient configuration because the process chain provides for an uninterruptible supply with the liquid to be measured, without the applicant having to take action himself.

A separate aspect of the invention relates to an assembly including a filling level measuring device as has been described above, and at least one spacer which can be attached to the lower edge of a container to be provided with the filling level measuring device. The spacer can serve to increase the distance between the bottom of the container and the ground, so that the filling level measuring device can be reliably mounted there even when the container is placed on an uneven ground (for example gravel). Use of the spacers reduces the risk of the container that is provided with the filling level measuring device being supported on the ground via the filling level measuring device, which might possibly result in damage to the filling level measuring device.

The spacer may be a base having an open or a closed bottom. Such a base is preferred especially when the container is to be placed on a loose ground. A closed bottom will provide even more protection.

The base preferably includes two positioning formations for two types of containers. The positioning formations may be rings or clamps, for example, which can be used for reliably attaching the base to a foot ring of the container. Having different positioning formations allows one and the same base to be used for different containers.

Provision may also be made that the spacer consists of three or more spacer elements which can be clipped to the lower edge of the container and which can be mounted by a user in a flexible manner whenever this is advantageous in a particular case.

Preferably, each spacer element includes a slot of a first type and at least one second slot of a further type. This allows the use of the same spacer elements for different containers.

Preferably, the spacer elements are built up of an elastic plastic material, so that a deformation of the slots allows further types of containers to be used in that the slots flexibly adapt to the container edge.

The invention will be described below with reference to various embodiments which are illustrated in the accompanying drawings, in which.

Figure 6:
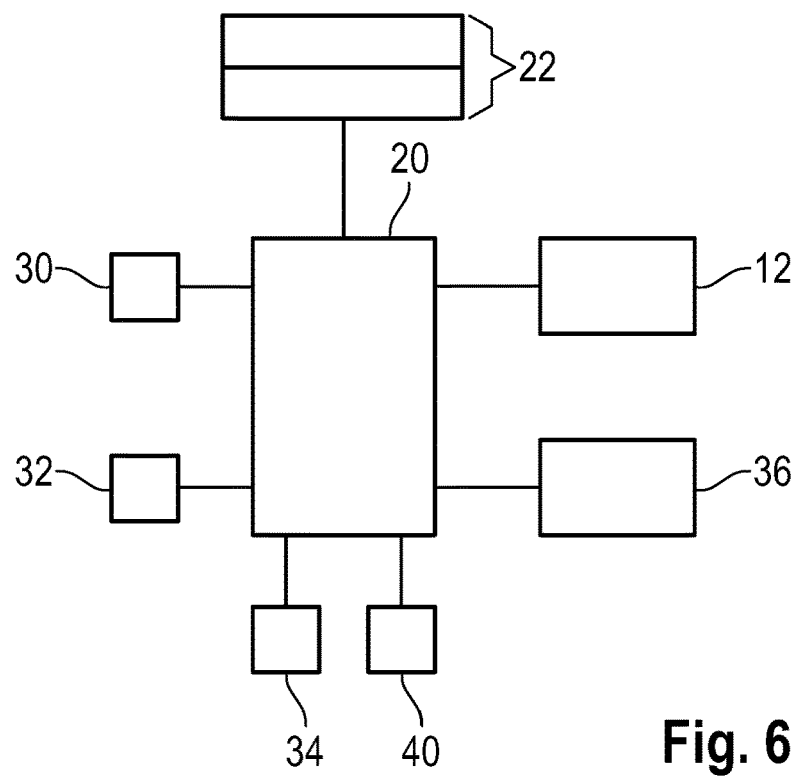
Figure 7:
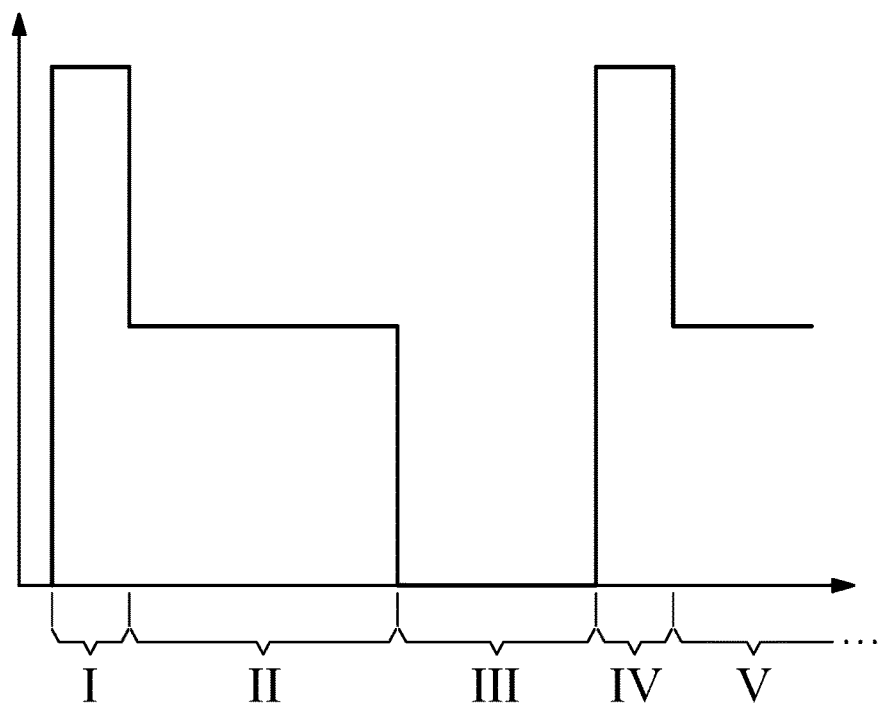
Figure 8:
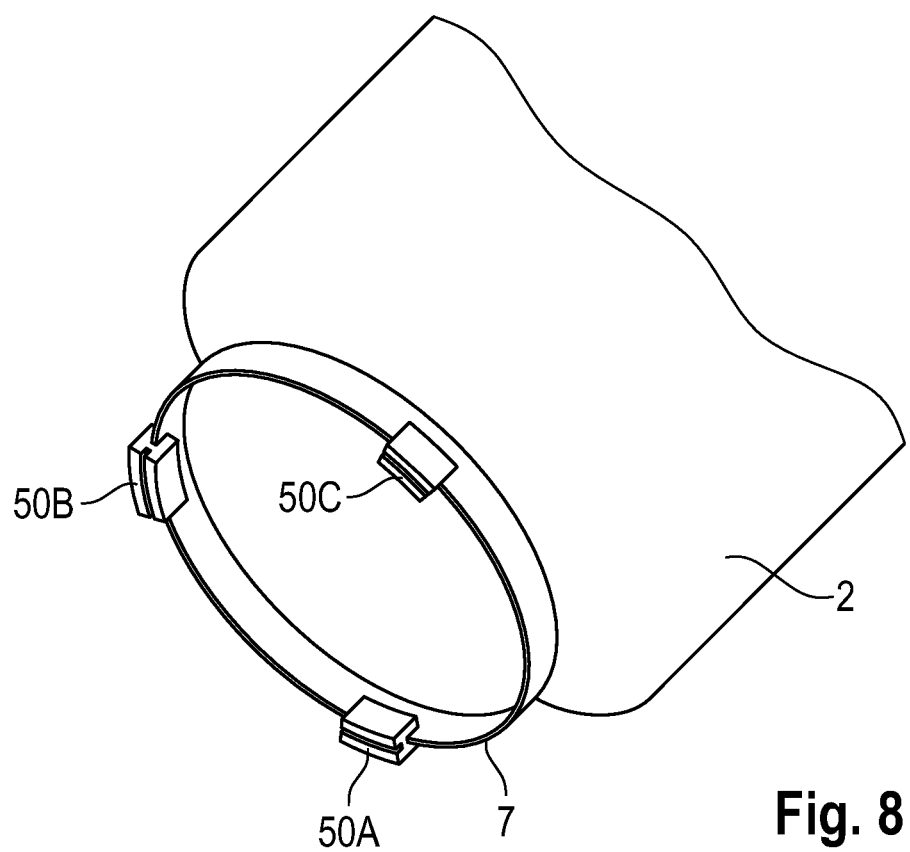
Figure 9:
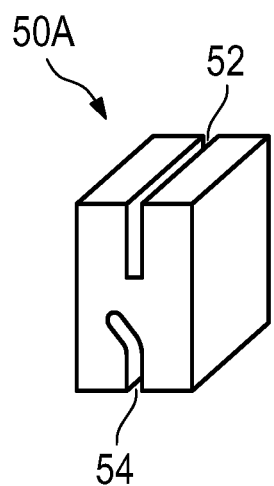
Figure 10:
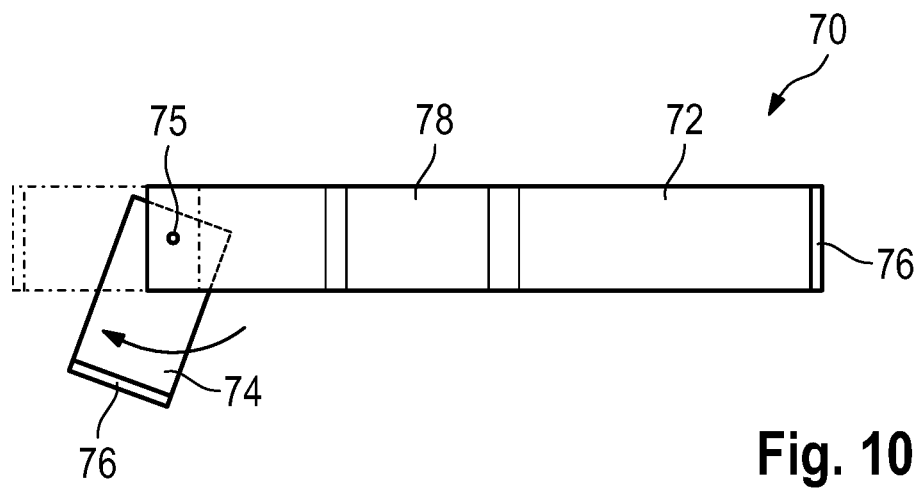
Figure 11:
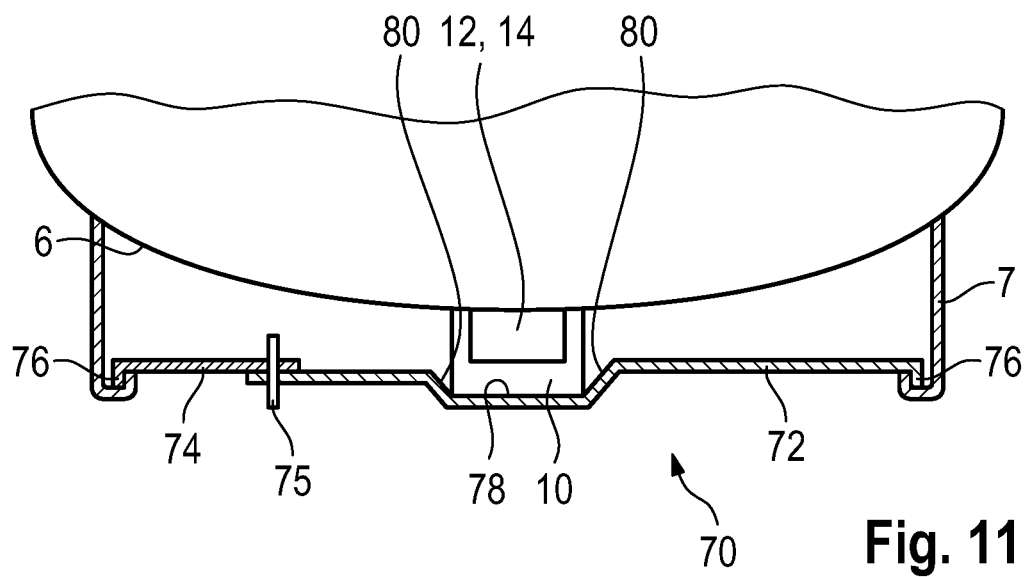
Figure 12:
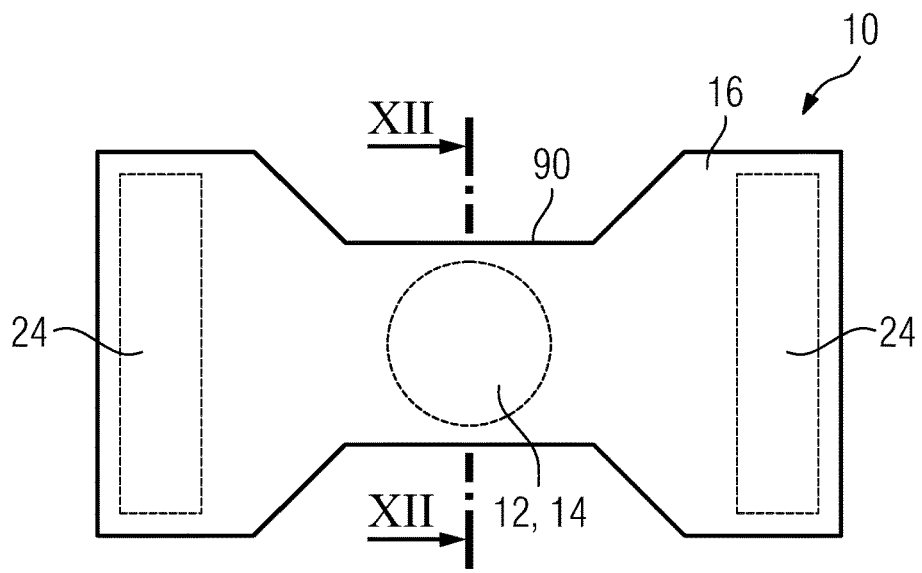
Figure 13:
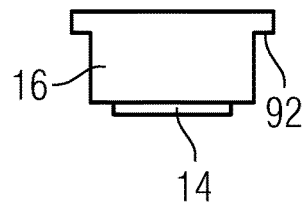

FIG. 6 schematically shows the electronic components of a filling level measuring device according to the invention;

FIG. 7 shows, in a diagram, the sampling rate used by the filling level measuring device, over time;

FIG. 8 shows a perspective broken-away view of three spacer elements which are mounted to a container;

FIG. 9 shows an enlarged perspective view of one of the spacer elements shown in FIG. 8;

FIG. 10 shows a schematic top view of a spring clip used for attaching the filling level measuring device;

FIG. 11 shows a schematic sectional view of a filling level measuring device attached to a container by means of the spring clip of FIG. 10;

FIG. 12 shows a schematic top view of a housing of the filling level measuring device;

FIG. 13 shows a schematic sectional view of the housing of FIG. 12; and

Figure 14:
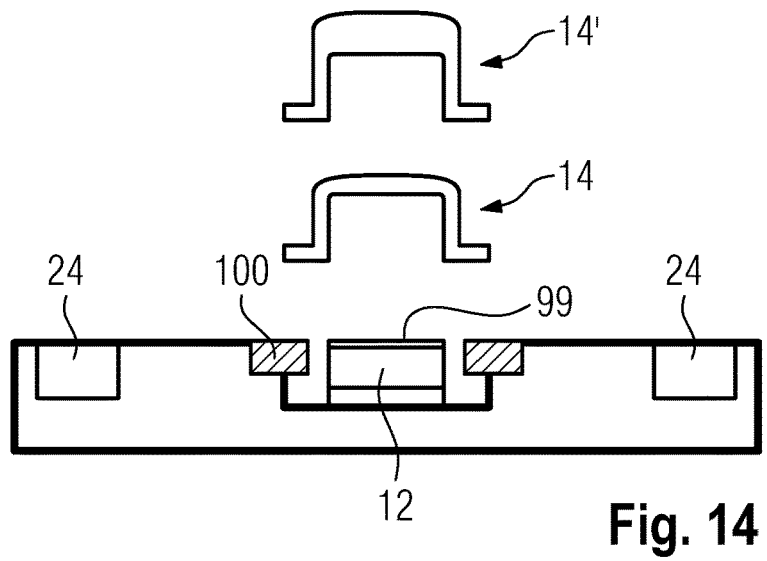

FIG. 14 shows a schematic view of a filling level measuring device according to a further embodiment.

Figure 1:
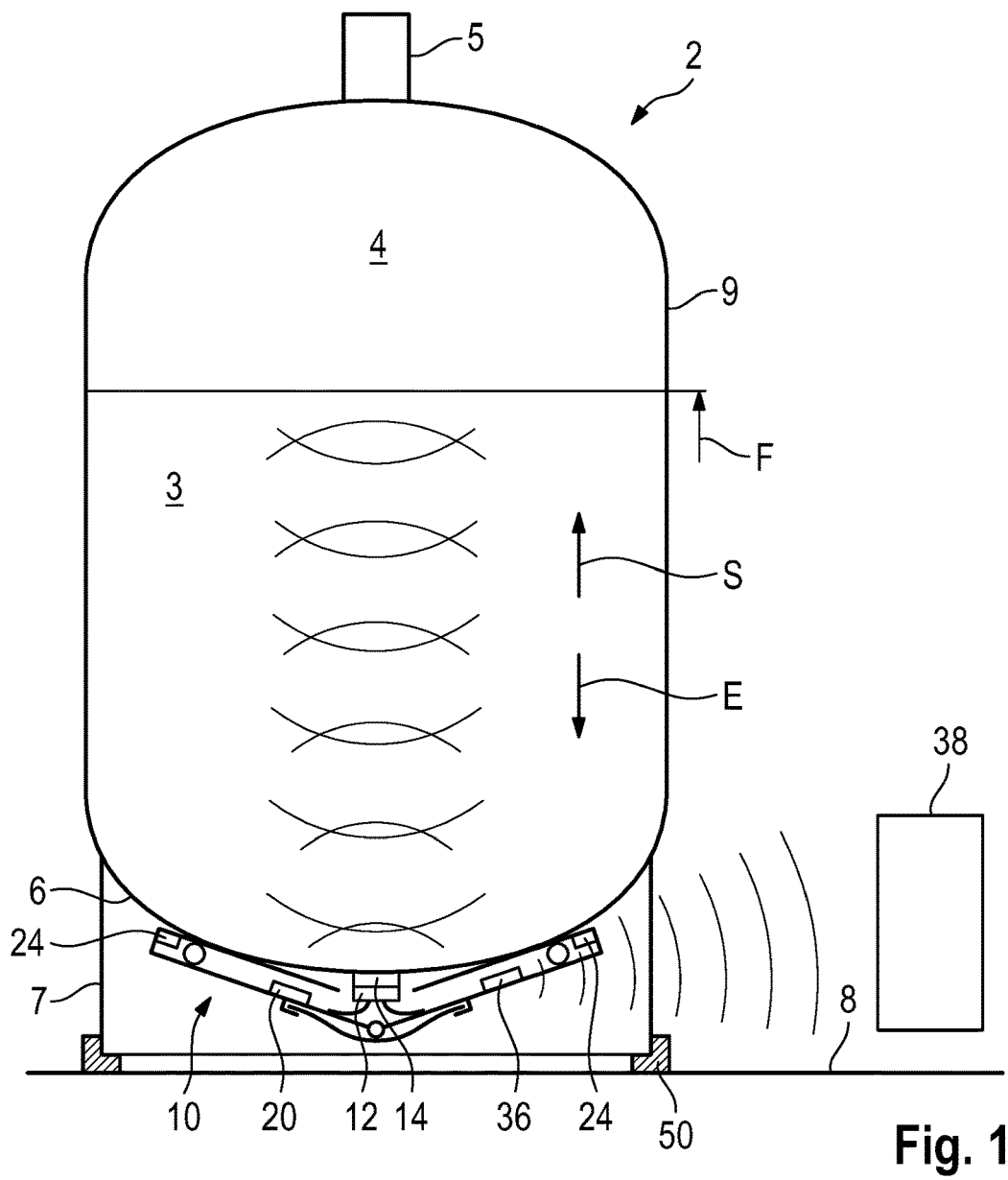
FIG. 1 shows a schematic sectional view of a filling level measuring device according to the invention, attached to a container.

FIG. 1 shows a container 2 in the interior of which a liquid 3 is contained. The liquid 3 fills the interior of the container 2 up to a filling level F; above the liquid surface there is a gaseous medium 4, which may be vaporized liquid 3 or air that has absorbed a certain portion of vaporized liquid 3.

In the exemplary embodiment shown, the container 2 is a liquefied gas cylinder which is provided with a gas connection 5, a bottom 6, and a foot ring 7. The liquefied gas cylinder stands on a ground 8, for instance the bottom of a gas box of a recreational vehicle, by its foot ring 7. The wall 9 of the liquefied gas cylinder consists of a ferromagnetic steel alloy.

Attached to the bottom 6 of the liquefied gas cylinder is a filling level measuring device 10 which can be used for determining the filling level F within the liquefied gas cylinder and thus the quantity of the liquefied gas present in the liquefied gas cylinder.

Although the filling level measuring device 10 will be described in connection with a liquefied gas cylinder below, it is basically suitable and intended for use with other types of containers 2. It is also not absolutely necessary to attach the filling level measuring device 10 to the bottom 6 of a container. The filling level measuring device 10 could also be arranged on the side wall or on the top of the container, for example.

For determining the filling level F within the container 2, the filling level measuring device 10 operates with ultrasounds. In general terms, ultrasonic waves are generated, which are coupled into the wall 9 of the container (in the exemplary embodiment shown, specifically into the bottom 6). The ultrasonic waves travel from there through the liquid as a signal S and are reflected at the interface between the liquid medium and the gaseous medium, so that they return as an echo E. This echo can be detected by the filling level measuring device 10. The propagation time of the sound waves is indicative of the filling level and, if the geometry of the container 2 is known, this filling level can be converted to a filling quantity (either liters or kilograms).

The filling level measuring device 10 includes an ultrasonic measuring head 12 which more particularly is a piezoceramics. On the side facing the container 2, the ultrasonic measuring head 12 is provided with a coupling cushion 14 which is made from an elastomer such as silicone. The coupling cushion 14 serves to couple the oscillations of the piezoceramics into the wall of the container 2 and, conversely, to transmit the oscillations of the wall of the container 2 that result from the echo E back to the piezoceramics.

The ultrasonic measuring head 12 is arranged in a housing 16 which is configured in two parts here. It consists of a housing part 16A and a housing part 16B, which are connected with each other. In the exemplary embodiment shown, a schematically illustrated hinge 18 is provided here.

The filling level measuring device 10 is further provided with a controller 20 which can be made use of for measuring the filling level. Details of the controller will be discussed further below with reference to FIG. 5.

Provision is made for an energy supply in the form of two exchangeable batteries 22, which provides the electric energy necessary for the operation of the controller 20. The batteries may be commercially available size AA batteries.

The batteries 22 are arranged in the housing parts 16A, 16B as close to the outer ends as possible, that is, at a large distance from the hinge 18.

To be able to fasten the filling level measuring device 10 to the container 2, a fastening device 24 is provided which, in this case, consists of two magnets. Here, each housing part 16A, 16B has one magnet 24 arranged therein, more specifically on the side facing away from the hinge 18.

The ultrasonic measuring head 12 is arranged in the housing 16 so as to be elastically spring-mounted, more precisely such that it is urged out of the housing 16 towards that side on which the magnets 24 are arranged.

Two springs 26 are provided here for the spring-mounted attachment of the ultrasonic measuring head.

The springs 26 may be separate springs which are mounted in the housing parts 16A, 16B. It is preferred, however, that the springs 26 are produced in one piece with the housing parts 16A, 16B, namely, in the form of injection molded elements of the housing parts 16A, 16B.

Figure 2:
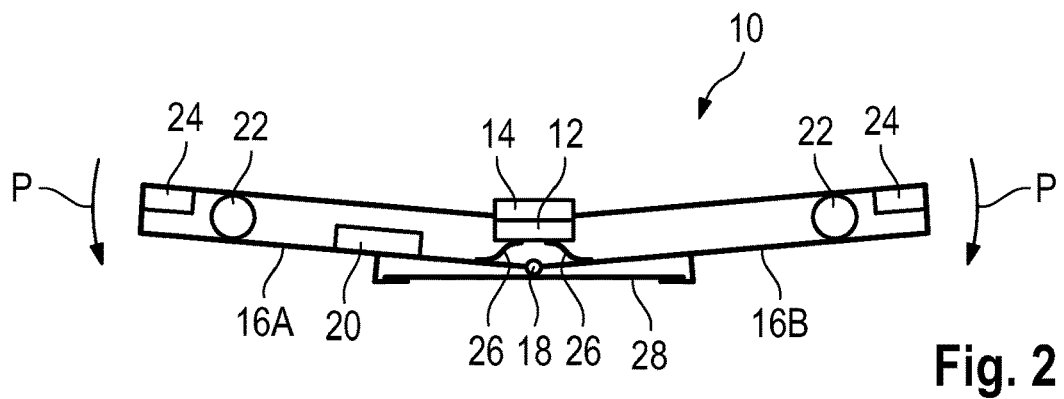
FIG. 2 shows a schematic sectional view of the filling level measuring device of FIG. 1.

The housing 16 is provided with a spring band 28 which is effective between the two housing parts 16A, 16B. The spring band 28 acts upon the two housing parts relative to each other in the direction of the arrows P shown in FIG. 2, that is, urging the magnets 24 away from a "top side" which is defined by the side on which the coupling cushion 14 is located.

To attach the filling level measuring device 10 to the container 2, it is applied to the bottom 6 such that the ultrasonic measuring head 12 is located roughly at the lowest point of the bottom. Then the two housing parts 16A, 16B are pressed against the bottom 6 contrary to the action of the spring band 28 such that the magnets 24 will magnetically adhere to the bottom 6. Owing to the action of the spring band 28, the housing 16 is pressed against the curved bottom 6 of the container 2 in the region of the hinge 18, as a result of which the ultrasonic measuring head 12 is pressed by its coupling cushion 14 against the bottom 6 of the container 2. Here, the springs 26 provide for the desired contact pressure (as required with a view to the transmission of ultrasonic waves) and also for a tolerance compensation.

Figure 3:
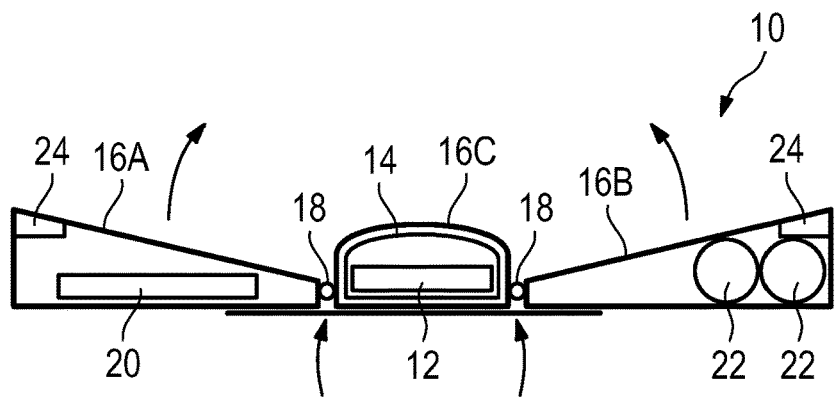
FIG. 3 shows a schematic sectional view of a filling level measuring device according to a second embodiment.
Figure 4:
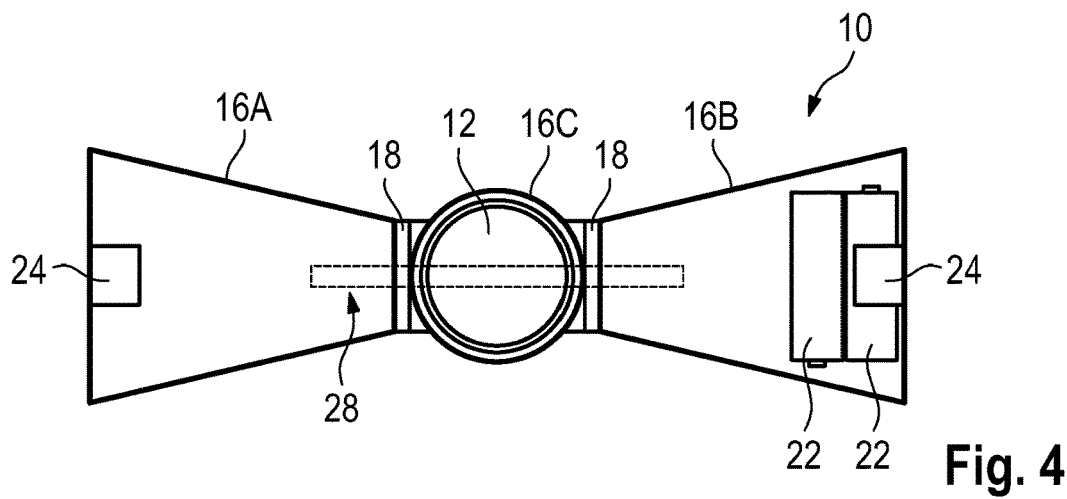
FIG. 4 shows a top view of the filling level measuring device of FIG. 3.

FIGS. 3 and 4 show a second embodiment of the filling level measuring device 10. The same reference numbers are used for the components known from the first embodiment, and reference is made to the above discussions in this respect.

The difference between the first and second embodiments resides in that in the second embodiment, the two housing parts 16A, 16B are attached to opposite sides of a central housing part 16C, rather than to each other. Mounted in the housing part 16C is the ultrasonic measuring head 12. Like in the first embodiment, springs may be used for this.

Unlike in the first embodiment, the hinge 18 used between the first housing part 16A and the third housing part 16C and also between the third housing part 16C and the second housing part 16B is not a fixed hinge, but an elastomeric joint which allows the desired mobility between the housing parts.

In the second embodiment as well, the housing parts 16A, 16B, 16C have a spring band 28 integrated therein which urges the housing parts 16A, 16B, 16C to an initial position.

In the initial position, the lower sides of the three housing parts may extend in one plane (see FIG. 3).

A further difference between the first and second embodiments resides in that in the second embodiment, the energy supply (here, too, batteries 22 are used) is not split up to two housing parts, but that two batteries 22 are arranged side by side in one housing part (in this case, the second housing part 16B). But the batteries 22 are arranged on the outer edge in the same way as in the first embodiment.

The filling level measuring device 10 according to the second embodiment is attached to the container in the same manner as has been discussed for the first embodiment. When the two housing parts 16A, 16B are approached to the wall of the container 2 such that the magnets 24 adhere to the wall 9 of the container, the desired pretension between the ultrasonic measuring head 12 and the wall of the container will be automatically produced.

Figure 5:
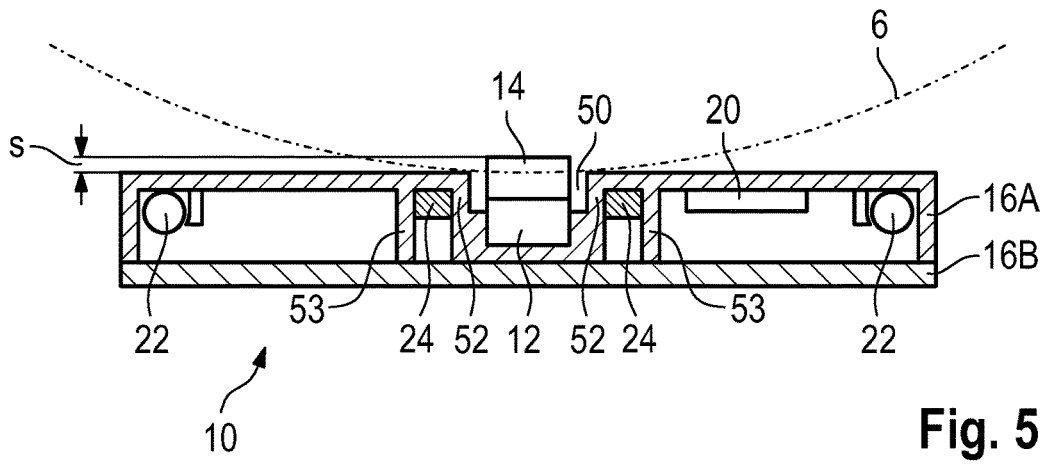
FIG. 5 shows a schematic sectional view of a filling level measuring device according to a third embodiment.

FIG. 5 shows a filling level measuring device according to a third embodiment. The same reference numbers are used for the components known from the preceding embodiments, and reference is made to the above discussions in this respect.

In the third embodiment, a rigid housing 16 is used, which consists of an upper part 16A and a lower part 16B. The two parts 16A, 16B may be snap-fitted to each other, so that a user can exchange the batteries 22 received therein with little effort.

As an alternative, it is also possible to provide two small covers on the lower side, each for one battery compartment, so that a user can exchange the batteries without separating the two parts 16A, 16B from each other.

The difference between the third and the first two embodiments resides in that in the third embodiment, the ultrasonic measuring head 12 is rigidly mounted in the housing.

Here, the necessary pretension between the wall of the container 2 and the ultrasonic measuring head 12 is obtained solely by the dimensioning of the coupling cushion 14 and the material thereof. In this connection, the material is selected with regard to its dimensions and its properties such that the required contact pressure is generated and will be provided over the entire service life of the device.

The coupling cushion 14 projects slightly over the side of the housing 16 that faces the container 2. The projection s may be on the order of 1 to 2 mm.

When the filling level measuring device 10 is applied to a container (see the bottom wall 6 of a container, indicated in dashed lines in FIG. 5), the wall thereof compresses the coupling cushion 14 under the action of the force of attraction of the fastening device 24, so that the desired pretension is produced. The coupling cushion 14 can yield laterally here, since an annular free space 50 is provided between the housing 16 and the coupling cushion.

The projection s of the coupling cushion defines the maximum extent to which the coupling cushion 14 can be compressed (for a wall of a container with the smallest radius of curvature).

A further difference between the third and the first two embodiments consists in that in the third embodiment, a load transmission section 52 is provided in the housing. It serves to transmit loads which act on the side of the housing 16 facing away from the container 2 directly to the side of the housing 16 facing the container 2 and from there to the wall of the container 2.

The load transmission section is configured as a material section here that is continuous from the top side to the lower side of the housing 16. It is ring-shaped and surrounds the ultrasonic measuring head 12 and the coupling cushion 14, so that the free space 50 is provided. As an alternative, a plurality of separate load transmission sections which are configured like posts, for example, could also be used.

If excessively high loads or stresses act on the filling level measuring device 10 (for example if the container 2 provided with the filling level measuring device 10 is placed on a gravel ground and a stone presses against the housing 16), these loads or stresses are transmitted through the housing and introduced into the wall of the container 2. The housing can not be damaged here since the load transmission section extends directly from the bottom (in this case, from the lower part 16B) to the top side of the housing 16 (in this case, to the upper part 16A).

At the same time, the coupling cushion is protected from any excessively high loads since, as from a particular load, the top side of the housing 16 rests against the container and the coupling cushion 14 can not be compressed further.

An annular magnet 24 which is arranged in an annular retainer 60 may be used as the fastening device. The bottom of the retainer 60 (in the orientation of the housing as shown in FIG. 5: the upper side of the retainer) is formed by a wall of the housing. The radially inner side of the retainer is formed by the load transmission section 52 here.

When the filling level measuring device 10 is mounted to a container, the magnet pulls the housing 16 against the container so that the filling level measuring device 10 is fixed in place on the wall of the container. At the same time, the adhesive forces pull the magnet 24 against the wall which defines the retainer 60. It is therefore sufficient to secure the magnet 24 only in such a way as to prevent it from falling out of the retainer 60.

The radially outer side of the retainer (material section 53) here extends as far as to the lower part 16B of the housing 16 and thus acts as a part of the load transmission section 52.

As an alternative to an annular magnet 24, a plurality of individual magnets may also be used, which are then arranged around the ultrasonic measuring head 12. For example, three magnets may be used, which are concentrically arranged in separate retainers around the ultrasonic measuring head 12, spaced apart by 120 degrees.

The features of a load transmission section 52 and of a retainer for the magnets which is closed by a wall of the housing 16 on the side of the container may also be employed, separately or in combination, with the first or the second embodiment.

In all of the embodiments of the housing, the controller 20 (see FIG. 6) is able to drive the ultrasonic measuring head 12 in a suitable manner to generate ultrasonic waves there and to detect when an ultrasonic echo impinges on the ultrasonic measuring head 12.

To increase the accuracy of the filling level measurement, a temperature sensor 30 is preferably provided which allows the controller 20 to take the (approximated) temperature of the liquid 3 inside the container 2 into account in evaluating the propagation time signal. The temperature sensor 30 may, for example, be molded or encapsulated within the coupling cushion 14, so that the temperature measured by it is dependent, at least to a certain extent, on the temperature of the wall 9 against which the coupling cushion 14 is pressed during a measurement. Alternatively, it is possible to arrange the temperature sensor 30 within the housing 16.

The controller 20 further includes a prognosis module 32 for enabling the controller 20 to make a projection as to how long the supply of liquid 3 in the cylinder 2 will still last, in dependence on the current filling level and depending on consumption values from the past (assuming that the consumption values do not vary significantly).

Further provided is a characteristics module 34 in which the quantity (or the volume) of liquid 3 present in the container 2 in dependence on the filling level F is recorded. The type of liquid 3 which is in the container 2 may also be laid down in the characteristics module 34. This is relevant in cases where the filling level measuring device 10 is intended for universal use for filling level measurements in a variety of different containers, since different liquids have different sound velocities that need to be considered in the filling level measurement.

The controller 20 has a communication interface 36 assigned to it, via which the result of the filling level measurement is made available to a user.

In the exemplary embodiment shown, the communication interface 36 is a wireless communication interface which operates on the Bluetooth standard and via which it is possible to send the measurement result to a receiver 38 (see FIG. 1).

The receiver 38 may be a smartphone of a user, for example. It can couple to the filling level measuring device 10 and can either initiate a measuring process or retrieve a measured filling level value stored in a measured value memory 40 of the controller 20.

The receiver 38 may also be a higher-level device control, for example in a recreational vehicle, which serves for a central control and monitoring of different devices such as a heating, an air conditioning system or a water supply. The controller 20 of the filling level measuring device 10 can transmit to this device control a measured filling level value, so that the latter can be displayed to a user on a central operating panel or, again, on a mobile terminal (smartphone) which is connected to the higher-level device control.

The measured value memory 40 also ensures that no data loss whatsoever will occur if the communication with a receiver 38 is temporarily interrupted; nonetheless, prognostic data, for example, are available again at any time. In addition, measured values may be made available to a plurality of receivers 38 without any problem, even if some of them were connected to the communication interface 36 only recently.

When the filling level measuring device 10 is newly attached to a container 2, initially a high sampling rate may be utilized (see area I in FIG. 7). For example, measurements of the filling level may be carried out in intervals of one second. The measured values obtained here are averaged, so that the current filling level is ascertained fairly reliably after a relatively short time (one minute at most, for example). Subsequently, the sampling rate is reduced (either in a time-controlled manner or when the controller realizes that the filling levels ascertained vary sufficiently stably about a mean value) (see area II in FIG. 7). For example, the sampling rate is decreased to one measurement per minute. This sampling rate is sufficient for detecting a change in the filling level F of the container 2 and also for providing a prognosis about the range of the remaining filling level.

If the controller 20 detects, over a certain period of time (which may possibly be specifiable by the user), that the filling level F does not change, the sampling rate can be reduced further (see the area III in FIG. 7). For example, only one measurement per hour will be taken then.

If the controller 20 detects that the communication interface 36 no longer has a receiver 38 coupled to it, the sampling rate may also be reduced to zero.

In response to an external signal (either a change in the filling level or a coupling of a receiver 38 to the communication interface 36), the sampling rate is increased again (see area IV of FIG. 7). In doing so, measurements can either be taken with a high sampling rate, as is illustrated here (this is advisable in particular if a sampling rate of zero had been used in the meantime), in order to be able to reliably ascertain a starting filling level in case the container has possibly been exchanged. As an alternative, measurements can be continued using a mean sampling rate (corresponding to area V of FIG. 7), to be able to continue to reliably record the consumption and the filling level that changes accordingly.

Based on the variable sampling rate, and in particular based on the fact that the sampling rate is lowered to the greatest possible extent if this is possible without an impairment as regards the measuring accuracy, one set of batteries 22 allows to obtain a period of operation of up to a year.

According to one variant embodiment, the filling level measuring device 10 is provided with current limiting diodes which ensure that the energy made available to the controller 20 remains below certain limits. As a result, it is not necessary to encapsulate or pot the components of the controller so as to make them explosion-proof in order to be able to employ the filling level measuring device without any problem in areas that are subject to explosion hazards.

In various applications it may be advantageous to make provision for a spacer 50 between the container 2 and the ground 8. If it is made of a plastic material, a spacer 50 can be used for producing an intermediate space between the foot ring 7 and the possibly metallic bottom of a gas box, as a result of which the wireless communication between the communication interface 36 and the receiver 38 is improved.

A spacer 50 may also be of advantage if the container 2 with the filling level measuring device 10 attached thereto is to be placed on a loose ground, such as gravel. Here there is the risk of the foot ring 7 digging into the ground 8 and the filling level measuring device 10 being pressed against any protruding portions of the ground 8 under the weight of the container 2.

The spacer 50 may be a surrounding ring, for example (see FIG. 1), which is adapted to the diameter of the foot ring 7 and may be provided with a plurality of smaller magnets, so that it adheres to the foot ring 7. This makes handling easier.

Protection from mechanical influences is still further improved if the ring in question has a closed bottom. This bottom may be connected with the ring by a substance-to-substance bond, for example in that the ring and the bottom are made from a thermoformed plastic part.

The spacer 50 may also be formed by a plurality of spacer elements 50A, 50B, 50C, as are illustrated in FIGS. 8 and 9. The spacer elements 50A, 50B, 50C are clip-like plastic parts here, which are provided with a slot 52 of a first type and a slot 54 of a second type. The slots 52, 54 are adapted to different foot rings 7, so that the spacer elements can be used with different containers 2. Depending on the type of container, the spacer elements are clipped onto the foot ring 7 in one orientation or the other.

The filling level measuring device 10 can also be attached to containers 2 by means of fastening devices 24 of other configurations, in particular to containers that are not made of a ferromagnetic material, such as, e.g., of an aluminum alloy. For instance, a tensioning strap may be used for attaching the filling level measuring device 10 to the circumference of the wall 9.

The filling level measuring device 10 may also be glued onto the wall 9 of the container.

FIGS. 10 and 11 show an embodiment in which a spring clip 70 is used by means of which the filling level measuring device 10 is mounted inside a foot ring 7. This spring clip can then support itself against a flanged edge portion of the foot ring 7 and allows the filling level measuring device 10 to be attached to an aluminum gas cylinder, for example.

The spring clip 70 includes a basic element 72 which is connected with the filling level measuring device 10, and a locking element 74. The locking element 74 is pivotably connected with the basic element 72 here (for example by means of a pin or rivet 75), so that it can be transferred from a folded-in position (see locking element 74 shown in solid lines in FIG. 10), in which the spring clip 70 has a length that is smaller than the inside diameter of the foot ring 7, to a folded-out position (illustrated in dashed lines in FIG. 10), in which the length of the spring clip 70 is greater than the inside diameter of the foot ring 7.

The basic element 72 and the locking element 74 each have a bent end 76 which constitutes a hook that can be hooked in the inside of the foot ring 7.

The basic element 72 is provided with a holder 78 or a similar positioning formation, so that the filling level measuring device 10 is held in the middle of the spring clip 70. The holder 78 may be formed by two embossed portions of the basic element 72 or else by positioning pins mounted there.

The filling level measuring device is held in the holder 78 firstly by resting against the side walls 80 and, secondly, by magnetic force. The magnets that attract the filling level measuring device 10 to a ferromagnetic wall of a gas cylinder make sure in this connection that the filling level measuring device 10 adheres to the basic element 72 of the spring clip 70. In this way, the filling level measuring device 10 constitutes a unit with the spring clip 70, so that a user can mount it with one hand while he/she holds the gas cylinder with the other hand.

The spring clip 70 is preferably made of galvanized steel.

FIGS. 12 and 13 show a preferred housing 16 for the filling level measuring device 10. It has a constriction 90 in the middle, so that it is easily possible for a user to grasp the filling level measuring device and to pull it off from a container contrary to the magnetic forces that act. Applying it in the center of the bottom of the container is also facilitated in this way.

As can be seen in FIG. 13, the housing 16 may be provided with a gripping edge 92 or a similar formation, for instance a corrugation, in the region of the constriction, which makes it even simpler for the user to remove the housing 16 from a container or to apply it precisely.

FIG. 14 shows a further embodiment. The same reference numbers are used for the components known from the preceding embodiments, and reference is made to the above discussions in this respect.

An essential feature of the embodiment shown in FIG. 14 is that the coupling cushion 14 is exchangeably mounted to the housing 16. Therefore, a user can exchange the coupling cushion 14 if this is required.

One reason for an exchange may reside in that the coupling cushion 14 is worn to such an extent that it no longer allows a reliable measurement, or that it has aged to such an extent and thus has become brittle such that a reliable measurement is no longer possible. A further reason for an exchange of the coupling cushion 14 may reside in that the filling level measuring device 10 is to be adapted to different containers.

If it is intended to attach the filling level measuring device 10 to the uniformly convex bottom of a container 2, a first coupling cushion 14 may be used which generates an appropriate contact pressure here. If, on the other hand, the filling level measuring device 10 is to be attached to the bottom of a container that is provided with a concave depression in the center, a second coupling cushion 14' may be used which, owing to a larger wall thickness in the central portion, protrudes further over the housing 10 than the first coupling cushion 14 and therefore generates an appropriate contact pressure in spite of the depression at the bottom of the container.

The coupling cushions may be adhesively bonded to the ultrasonic measuring head 12. To this end, a double-sided adhesive tape 99, for example, may be provided on the ultrasonic measuring head 12 or on the coupling cushion. The adhesive force of the adhesive tape 99 is sufficient to fix the (exchange) coupling cushion 14 or 14', respectively, in place to such an extent that it will not inadvertently come off the ultrasonic measuring head 12. The actual contact force between the coupling cushion 14 or, respectively, 14' and the ultrasonic measuring head is, however, produced after the assembly by the magnetic forces that press the filling level measuring device 10 against the bottom of the container 2.

Alternatively or additionally, the coupling cushion 14 or, respectively, 14' may be fastened to the filling level measuring device 10 mechanically. To this end, clamping connections or a quarter-turn fastener may be used, so that the coupling cushion can, on the one hand, be exchanged with little effort, but, on the other hand, is reliably held. These mechanical fastening means are indicated schematically by a holding ring 100.

The filling level measuring device 10 may be sold in a set together with a variety of coupling cushions, so that a user always has the correct coupling cushion at his/her disposal for different containers or always has a spare coupling cushion available for an exchange.

The invention claimed is:

1. A filling level measuring device (10) for measuring the filling level in a container (2) through the wall (9) thereof by means of ultrasound, comprising an ultrasonic measuring head (12), a controller (20), and a fastening device (24) by means of which the filling level measuring device (10) can be fastened to the container (2) such that the ultrasonic measuring head (12) is pressed against the wall (9) of the container (2) a communication interface (36) being provided, the communication interface (36) including a transmitter/receiver unit for a wireless communication, characterized in that a housing (16) is provided having the components of the filling level measuring device (10) integrated therein, the housing (16) is configured in several parts with a joint (18) between the parts (16A, 16B, 16C), and the joint (18) is an elastomeric joint.

2. A filling level measuring device (10) for measuring the filling level in a container (2) through the wall (9) thereof by means of ultrasound, comprising an ultrasonic measuring head (12), a controller (20), and a fastening device (24) by means of which the filling level measuring device (10) can be fastened to the container (2) such that the ultrasonic measuring head (12) is pressed against the wall (9) of the container (2) a communication interface (36) being provided, the communication interface (36) including a transmitter/receiver unit for a wireless communication, characterized in that a housing (16) is provided having the components of the filling level measuring device (10) integrated therein, the housing (16) is configured in several parts with a joint (18) between the parts (16A, 16B, 16C), and that a spring band (28) is provided between the parts (16A, 16B, 16C).

3. A filling level measuring device (10) for measuring the filling level in a container (2) through the wall (9) thereof by means of ultrasound, comprising an ultrasonic measuring head (12), a controller (20), and a fastening device (24) by means of which the filling level measuring device (10) can be fastened to the container (2) such that the ultrasonic measuring head (12) is pressed against the wall (9) of the container (2) a communication interface (36) being provided, the communication interface (36) including a transmitter/receiver unit for a wireless communication, characterized in that a housing (16) is provided having the components of the filling level measuring device (10) integrated therein, that the ultrasonic measuring head (12) is arranged in the housing (16) so as to be spring-mounted, springs (26) are provided for urging the ultrasonic measuring head (12) against the wall (9) of the container (2), and, the springs (26) are configured from plastic in one piece with the housing (16).

4. A device for measuring the level of liquid in a container, comprising:
    a housing having an upper body and a lower body and defining an interior portion, the upper body having an aperture extending therethrough;
    an ultrasonic measuring head disposed at least partially within the aperture; and
    a coupling cushion,
    wherein the upper body is configured to receive at least a portion of the lower body therein,
    wherein the upper body has a wall that forms an exterior surface configured to face an exterior surface of the container and a coupling cushion lip recessed relative to the upper body wall forming the exterior surface of the upper body, and
    wherein the coupling cushion has a first surface configured to contact the container exterior and a second surface configured to contact the coupling cushion lip, wherein the device is configured to measure the level of liquid in a liquid fuel tank.

5. A device for measuring the level of liquid in a container, comprising:
    a housing having an upper body and a lower body and defining an interior portion, the upper body having an aperture extending therethrough;
    an ultrasonic measuring head disposed at least partially within the aperture; and
    a coupling cushion,
    wherein the upper body is configured to receive at least a portion of the lower body therein,
    wherein the upper body has a wall that forms an exterior surface configured to face an exterior surface of the container and a coupling cushion lip recessed relative to the upper body wall forming the exterior surface of the upper body, and
    wherein the coupling cushion has a first surface configured to contact the container exterior and a second surface configured to contact the coupling cushion lip,
    wherein the device comprises a controller and a wireless communication interface provided within the housing interior portion for communicating a liquid level from the controller to a receiver remote from the device.

6. The device of claim 5, wherein the wireless communication interface is configured to operate on a Bluetooth standard.

7. The device of claim 5, wherein the controller is configured to drive the ultrasonic measuring head to generate sonic waves and detect an echo impinging on the ultrasonic measuring head.

8. The device of claim 7, wherein the device comprises a plurality of magnets.

9. A device for measuring the level of liquid in a container, comprising:
- a housing having an upper body and a lower body and defining an interior portion, the upper body having an aperture extending therethrough;
- an ultrasonic measuring head disposed at least partially within the aperture; and
- a coupling cushion,
- wherein the upper body is configured to receive at least a portion of the lower body therein,
- wherein the upper body has a wall that forms an exterior surface configured to face an exterior surface of the container and a coupling cushion lip recessed relative to the upper body wall forming the exterior surface of the upper body, and
- wherein the coupling cushion has a first surface configured to contact the container exterior and a second surface configured to contact the coupling cushion lip,
- wherein the device comprises a magnet attached thereto, the magnet positioned to hold the device against the exterior surface of the container.

10. The device of claim 9, wherein the magnetic attraction of the magnets to the container overcomes the compressive force of the coupling cushion, such that the coupling cushion is pressed against the exterior surface of the container.

11. A kit comprising:
- a device for measuring the level of liquid in a container, comprising:
- a housing having an upper body and a lower body and defining an interior portion, the upper body having an aperture extending therethrough;
- an ultrasonic measuring head disposed at least partially within the aperture; and
- a coupling cushion,
- wherein the upper body is configured to receive at least a portion of the lower body therein,
- wherein the upper body has a wall that forms an exterior surface configured to face an exterior surface of the container and a coupling cushion lip recessed relative to the upper body wall forming the exterior surface of the upper body, and
- wherein the coupling cushion has a first surface configured to contact the container exterior and a second surface configured to contact the coupling cushion lip, and
- a plurality of spacer elements adapted to attach to a foot ring of the container.

* * * * *